(12) United States Patent
Wi et al.

(10) Patent No.: US 12,355,057 B2
(45) Date of Patent: Jul. 8, 2025

(54) ELECTRODE SHEET CONNECTION METHOD AND ELECTRODE SHEET

(71) Applicant: LG Energy Solution, Ltd., Seoul (KR)

(72) Inventors: Yoon Bong Wi, Daejeon (KR); Tae Won Kang, Daejeon (KR); Dong Hyeuk Park, Daejeon (KR); Gi Yang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 530 days.

(21) Appl. No.: 17/913,706

(22) PCT Filed: Sep. 17, 2021

(86) PCT No.: PCT/KR2021/012860
§ 371 (c)(1),
(2) Date: Sep. 22, 2022

(87) PCT Pub. No.: WO2022/097913
PCT Pub. Date: May 12, 2022

(65) Prior Publication Data
US 2023/0112926 A1   Apr. 13, 2023

(30) Foreign Application Priority Data

Nov. 6, 2020   (KR) .................. 10-2020-0148004

(51) Int. Cl.
*H01M 4/04* (2006.01)
*H01M 50/486* (2021.01)

(52) U.S. Cl.
CPC ....... *H01M 4/0435* (2013.01); *H01M 50/486* (2021.01)

(58) Field of Classification Search
CPC .......................... H01M 4/0435; H01M 50/486
See application file for complete search history.

(56) References Cited

U.S. PATENT DOCUMENTS

| 2015/0303485 A1 | 10/2015 | Kim et al. |
| 2019/0260089 A1 | 8/2019 | Park et al. |
| 2020/0403211 A1 | 12/2020 | Kim |

FOREIGN PATENT DOCUMENTS

| CN | 107895775 A | 4/2018 |
| CN | 207861573 U | 9/2018 |

(Continued)

OTHER PUBLICATIONS

Extended European Search Report including Search Opinion from 21889378.2 dated Sep. 10, 2024, pp. 1-10.

(Continued)

*Primary Examiner* — Sarah A. Slifka
(74) *Attorney, Agent, or Firm* — Lerner David LLP

(57) ABSTRACT

The present technology relates to a method for connecting electrode sheets in a roll-to-roll process, and the method includes: arranging a flexible connection sheet of a predetermined length between a first electrode sheet and a second electrode sheet; connecting the first electrode sheet to the flexible connection sheet by attaching one side of the first electrode sheet to one side of the flexible connection sheet using a first tape; and connecting the second electrode sheet to the flexible connection sheet by attaching one side of the second electrode sheet to the other side of the flexible connection sheet using a second tape.

Further, the present technology relates to an electrode sheet manufactured by manufactured by the method of connecting electrode sheets.

13 Claims, 5 Drawing Sheets

(56) References Cited

FOREIGN PATENT DOCUMENTS

| | | | |
|---|---|---|---|
| CN | 109952680 A | 6/2019 |
| CN | 111712946 A | 9/2020 |
| JP | H10-31998 A | 2/1998 |
| JP | 3580509 B2 | 10/2004 |
| JP | 2006172807 A | 6/2006 |
| JP | 5581849 B2 | 9/2014 |
| KR | 100819183 B1 | 4/2008 |
| KR | 20120005069 A | 1/2012 |
| KR | 20120086048 A | 8/2012 |
| KR | 20140069900 A | 6/2014 |
| KR | 20150037687 A | 4/2015 |
| KR | 101695650 B1 | 1/2017 |
| KR | 20180069391 A | 6/2018 |
| KR | 102043024 B1 | 11/2019 |
| WO | 2018-047427 A1 | 3/2018 |
| WO | 2019028331 A1 | 2/2019 |

OTHER PUBLICATIONS

1. Yu, Z. et al., "Research on flexible terminal electrode MLCC process" Electronic Components and Materials, Jan. 2018, pp. 19-22, vol. 37, No. 1. [English Translation of Abstract only].
Jian-Li, C. et al., "Test and Fabrication of Flexible Stretchable Electrode Based on MEMS Fabrication Process" Instrument Technique and Sensor, MEMS, Jun. 2016, pp. 21-24, No. 6. [English Translation of Abstract only].
Search Report dated Oct. 17, 2024 from the Office Action for Chinese Application No. 202180020054.2 Issued Oct. 22, 2024, pp. 1-3.
International Search Report for Application No. PCT/KR2021/012860 mailed Dec. 28, 2021, 2 pages.

[FIG. 1]
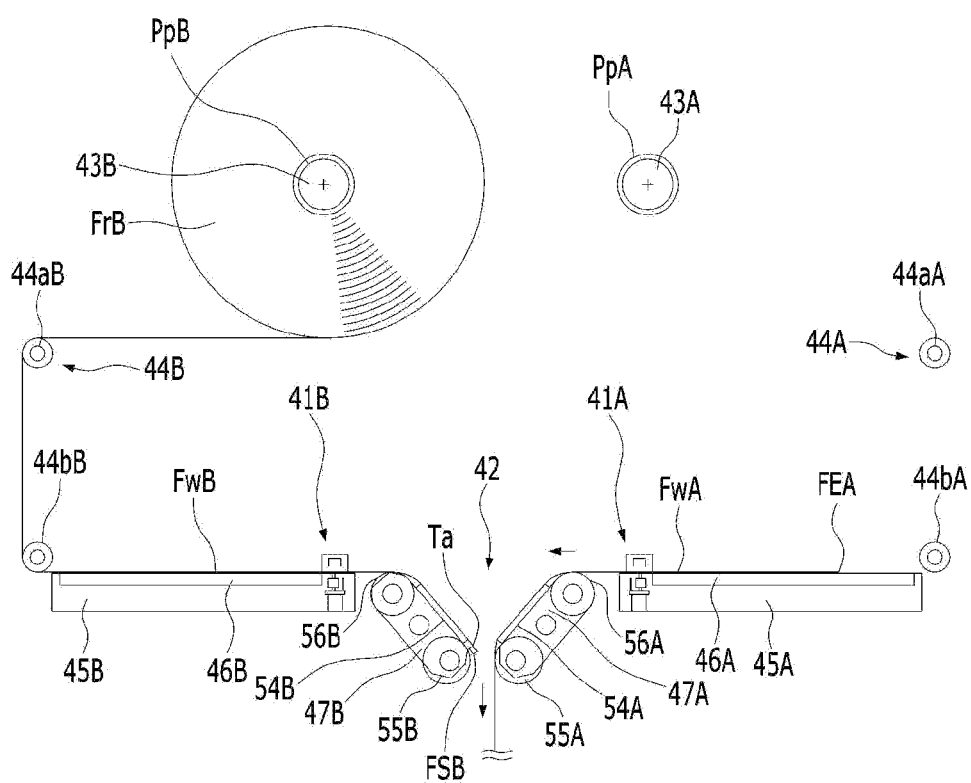

[FIG. 2]
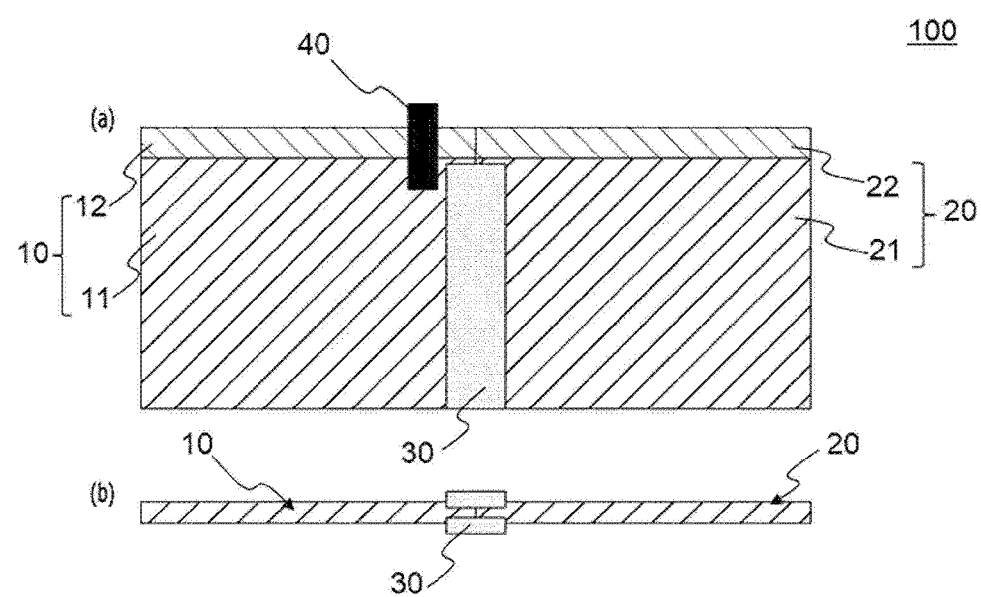

[FIG. 3]
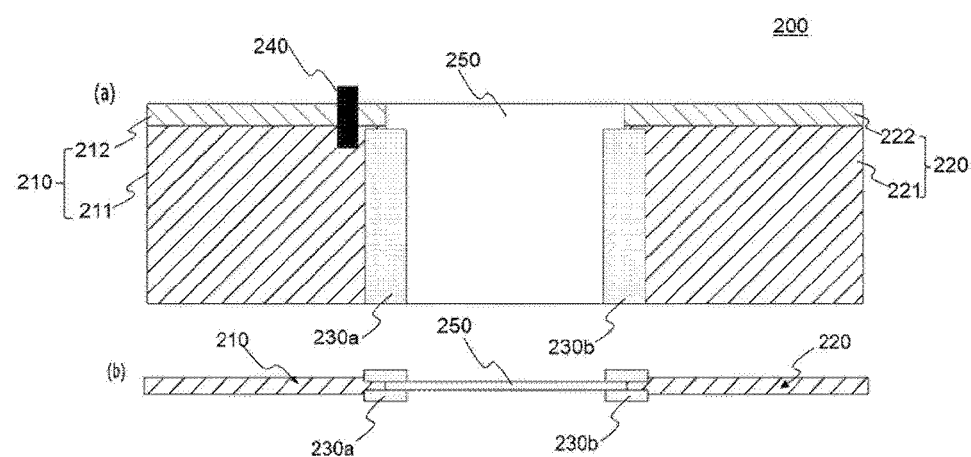

[FIG. 4]
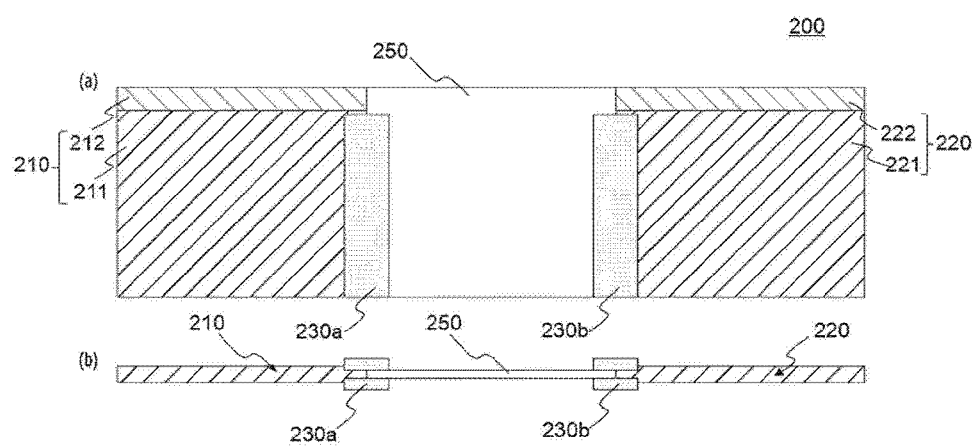

[FIG. 5]
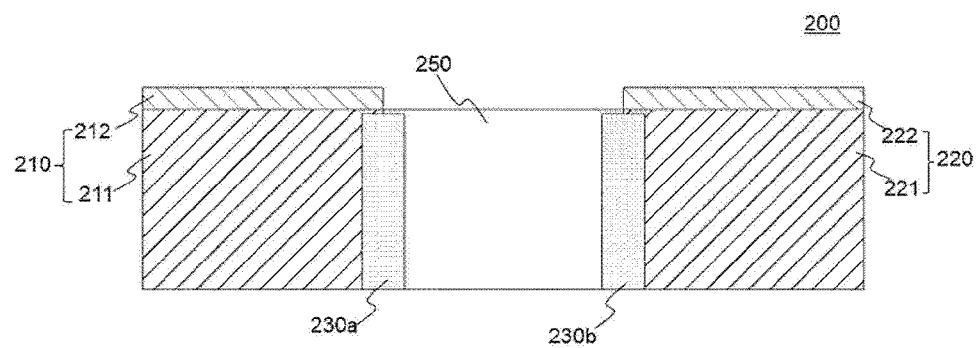

ELECTRODE SHEET CONNECTION METHOD AND ELECTRODE SHEET

CROSS-REFERENCE TO RELATED APPLICATIONS

The present application is a national phase entry under 35 U.S.C. § 371 of International Application No. PCT/KR2021/012860, filed on Sep. 17, 2021, which claims priority from Korean Patent Application No. 10-2020-0148004, filed on Nov. 6, 2020, and the entire contents of the Korean patent application are incorporated herein by reference.

TECHNICAL FIELD

The present invention relates to a method for connecting electrode sheets, and more particularly, to a method for connecting electrode sheets for a secondary battery in a roll-to-roll process.

The present invention also relates to an electrode sheet manufactured by the method of connecting electrode sheets.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

An electrode assembly for charging and discharging electric energy in a case is built in the lithium secondary battery. Electrodes (positive electrode and negative electrode) constituting the electrode assembly generate electric current through ion exchange, and each of the positive electrode and the negative electrode is manufactured as an electrode substrate, which is obtained by applying an electrode slurry on the surface of a current collector made of an aluminum or copper film and drying the electrode slurry. The positive and negative electrodes are then tab-processed (notching process) and cut in an appropriate size. Likewise, an electrode slurry, on which an electrode slurry has been applied, includes a coated portion, on which an electrode slurry has been coated, and a non-coated portion, on which an electrode slurry has not been coated. Various machining for battery production such as tab processing or laser processing are performed on the non-coated portion. Such processes of manufacturing and processing an electrode sheet are performed by a roll-to-roll process in which the electrode sheet, which is hung on a plurality of rollers, is moved on a predetermined path.

The electrode sheet is wound on the supply roller and is sequentially unwound to go through a series of manufacturing processes. If the electrode sheet of the supply roller is completely unwound, the electrode sheet needs to be replaced by a new electrode sheet by replacing the supply roller with a new supply roller. An auto splicer is an automatic connection device for continuously operating the machine when the use of one supply roller has been completed.

FIG. 1 is a diagram showing an example of a conventional auto splicer for connecting electrode sheets between supply rollers in a roll-to-roll process.

As illustrated, the auto splicer is a device for bonding a first web (FwA), which was unwound from one roll and is almost used, to a second web (FwB) which was unwound from another roll (FrB). A second web (FwB) is unwound from a roll (FrB) and is moved to a splicing table of a splicing unit via guide rollers 44aB and 44bB. Webs moved from the splicing table 45B are bonded in a compression roller 42.

FIG. 2 is a schematic diagram showing a process of connecting two electrode sheets in a roll-to-roll process. FIG. 2(a) is a plan view, and FIG. 2(b) is a side view.

As illustrated, a tape 30 is attached on one end of each electrode sheet in order to connect a first electrode sheet 10 (for example, an electrode sheet before replacement) to a second electrode sheet 20 (for example, an electrode sheet after replacement). A connection tag 40 for identifying the termination of use of the first electrode sheet 10 is attached on the end of the first electrode sheet 10.

As shown in the plan view of FIG. 2(a), coated portions 11 and 21, on which an electrode slurry has been coated, are positioned at the lower portion of the first and second electrode sheets 10 and 20, and non-coated portions 12 and 22, on which an electrode slurry has not been coated, are positioned at the upper portion of the first and second electrode sheets 10 and 20. The other surface of the first and second electrode sheets 10 and 20 also has the same structure. Namely, the electrode sheet has a structure in which an electrode slurry has been applied on the surface and the other surface of a metal foil.

Referring to the side view of FIG. 2(b), the sheet part of the metal foil is omitted in the drawing, and only the overall appearance of the coated portion, on which an electrode slurry has been coated, is shown.

In the conventional electrode sheet connection scheme as in FIG. 2, the connection part of electrode sheets may be disconnected due to stress. Namely, in a roll-to-roll process, the electrode sheet may be bent, and tension applied to the electrode sheet may not be constant. It may be different, depending on the portion of the electrode sheet. Hence, there may be a portion where tension is concentrated on the running path of the electrode sheet. When such a portion becomes the connection part of the electrode sheet, the electrode may be broken at the connection part. If the connection part is broken, a defect rate increases, and the device operation rate drops.

Further, since the tension applied to the electrode sheet is not constant in the roll-to-roll process, there comes to be a portion where meandering movement occurs, e.g., an undesirable movement of the electrode sheet. In the roll-to-roll process, the moving path of the meandering movement portion is adjusted to obtain an accurate position before performing a process in a certain processing unit.

However, in the conventional electrode sheet connection part, two electrode sheets are directly connected by a tape. Hence, it was not possible to adjust the moving path of the meandering movement portion.

Hence, there is a need for an electrode connection technology for relieving stress locally applied to the electrode sheet and adjusting the path of the meandering movement portion in a roll-to-roll process.

PRIOR ART LITERATURE

Patent Document

Korea Patent Publication No. 10-2014-0069900

DISCLOSURE

Technical Problem

The present invention is believed to solve at least some of the above problems. For example, an aspect of the present invention provides an electrode sheet connection method capable of relieving stress during the movement of the electrode sheet.

Further, another aspect of the present invention provides an electrode sheet for relieving stress during the movement of an electrode sheet and securing a margin at the time of adjustment of the meandering movement.

Technical Solution

A method for connecting electrode sheets in a roll-to-roll process of the present invention for solving the above problems includes: arranging a flexible connection sheet of a predetermined length between a first electrode sheet and a second electrode sheet; connecting the first electrode sheet to the flexible connection sheet by attaching one side of the first electrode sheet to one side of the flexible connection sheet using a first tape; and connecting the second electrode sheet to the flexible connection sheet by attaching one side of the second electrode sheet to the other side of the flexible connection sheet using a second tape.

In one example, the flexible connection sheet is made of one selected from the group consisting of polyethylene terephthalate (PET), polyethylene naphthalate (PEN), oriented polypropylene (OPP), polyimide (PI), polybutylene terephthalate (PBT), polyester, polyacetal, polyamide, polyethersulfone, polyphenyleneoxide, polyphenylene sulfide, polyethylenenaphthalene, and flexible silicon.

Specifically, a length of the flexible connection sheet is in a range of 100 to 2000 mm.

In one example, the first and second tapes are not attached on electrode slurry non-coated portions of the first electrode sheet and the second electrode sheet, respectively.

In one example, a thickness of the flexible connection sheet may be the same as or smaller than thicknesses of the first electrode sheet and the second electrode sheet, respectively.

In another example, the first electrode sheet or the second electrode sheet may not include a connection tag.

In another example, a width of the flexible connection sheet may be the same as or smaller than widths of the first electrode sheet and the second electrode sheet, respectively.

In a specific example, the width of the flexible connection sheet may be about the same as widths of electrode slurry coated portions of the first electrode sheet and the second electrode sheet, respectively, and wherein the flexible connection sheet may be connected to the first electrode sheet and the second electrode sheet by arranging the flexible connection sheet to be parallel to the electrode slurry coated portions of the first electrode sheet and the second electrode sheet so that their widths are opposite to each other.

An electrode sheet provided by the present invention includes: a first electrode sheet; a second electrode sheet; a flexible connection sheet of a predetermined length, which is arranged between the first electrode sheet and the second electrode sheet; a first tape which is used to attach one side of the first electrode sheet to one side of the flexible connection sheet; and a second tape which is used to attach one side of the second electrode sheet to the other side of the flexible connection sheet.

Advantageous Effects

According to the present invention, it is possible to significantly reduce the possibility of fracture at the connection part of the electrode sheet by including a flexible connection sheet capable of relieving stress due to tension between electrode sheets.

Further, according to the present invention, the flexible connection sheet portion provides a moving margin between electrode sheets before and after replacement, and a margin for adjusting the meandering movement may be secured by the moving margin.

BRIEF DESCRIPTION OF THE DRAWINGS

FIG. 1 is a diagram showing an example of an auto splicer in a conventional roll-to-roll process.

FIG. 2 is a schematic diagram showing a process of connecting two electrode sheets in a roll-to-roll process. FIG. 2(a) is a plan view, and FIG. 2(b) is a side view.

FIG. 3 is a schematic diagram showing a process of connecting electrode sheets according to an embodiment of the present invention. FIG. 3(a) is a plan view, and FIG. 3(b) is a side view.

FIG. 4 is a schematic diagram showing a process of connecting electrode sheets according to another embodiment of the present invention. FIG. 4(a) is a plan view, and FIG. 4(b) is a side view.

FIG. 5 is a schematic diagram showing a process of connecting electrode sheets according to further another embodiment of the present invention.

DETAILED DESCRIPTION OF THE PREFERRED EMBODIMENTS

Hereinafter, the detailed configuration of the present invention will be described in detail with reference to the accompanying drawings and various embodiments. Embodiments described below are exemplary to assist in understanding of the present invention, and in order to help understand the invention, the accompanying drawings are not shown as actual scale and the dimensions of some components may be exaggerated.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

An object of the present invention is to relieve stress during a roll-to-roll process by arranging a flexible connection sheet at the point of connection of electrode sheets. As shown in FIG. 2, when an electrode sheet is attached to an electrode sheet without a margin and connection is made by a tape, stress applied during the roll-to-roll process could not be absorbed. Namely, an electrode foil (metal sheet) such as aluminum or copper of the electrode sheet is hard and is not stretched. As such, when a local tension is applied, a strong impact is given. Hence, when various processes are performed, the load by devices of various processes are given, and the tension of the electrode sheet is concentrated on the electrode sheet connection part, which causes a damage to the connection part. Further, even if the conventional tape is made of a soft material, the tape is attached on only the coated portion for the attachment of the electrode sheet as in FIG. 2, but the tension concentration of the roll-to-roll process could not be solved. Further, even if the tape itself is flexible, the tape is attached on the coated portion by the adhesive of the lower portion. As such, the tape failed to absorb stress.

Hence, the present invention solves the existing technical problems by arranging a flexible connection sheet capable of relieving stress by absorbing tension between electrode sheets.

First Embodiment

FIG. 3 is a schematic diagram showing a process of connecting electrode sheets according to first embodiment of the present invention. FIG. 3(a) is a plan view, and FIG. 3(b) is a side view.

For the convenience of explanation, a horizontal direction on the plan view of FIG. 3(a) is defined as the longitudinal direction of the electrode sheet, the flexible connection sheet and the tape, and the vertical direction is defined as the width direction.

In order to connect electrode sheets, two electrode sheets, namely, a first electrode sheet 210 and a second electrode sheet 220 are arranged. For example, the first electrode sheet 210 may be an electrode sheet before replacement, which has been completely used, and the second electrode sheet 220 may be an electrode sheet after replacement which is to be newly used. The first electrode sheet 210 is unwound from a supply roller (running roller) (not shown), and the second electrode sheet 220 is unwound from another supply roller (standby roller), to thereby be positioned at predetermined positions. A flexible connection sheet 250 of a predetermined length is arranged between the first and second electrodes 210 and 220.

When a sensor senses a connection tag 240 at a point of time when the use of the first electrode sheet 210 is completed, a process of connecting first and second electrodes 210 and 220 is started. Namely, the first electrode sheet 210 is connected to the flexible connection sheet 250 by attaching one side of the first electrode sheet 210 to one side of the flexible connection sheet 250 by using a first tape 230a.

Thereafter, if the second electrode sheet 220 is connected to the flexible connection sheet 250 by attaching one side of the second electrode sheet 220 to the other side of the flexible connection sheet 250 using a second tape 230b, the first and second electrode sheets 210 and 220 are connected to each other by tapes 230a and 230b while having the flexible connection sheet 250 between the first and second electrode sheets 210 and 220.

The arrangement of the first and second electrode sheets 210 and 220 and the flexible connection sheet 250 and the attachment of the tape may be manually performed by a person, or may be performed in an automatic connection scheme using the above-described auto splicer.

As shown in the plan view of FIG. 3(a), coated portions 211 and 221, on which an electrode slurry has been coated, are positioned at the lower portion in the width direction of the first and second electrode sheets 210 and 220, and non-coated portions 212 and 222, on which an electrode slurry has not been coated, are positioned at the upper portion in the width direction of the first and second electrode sheets 210 and 220. The other surface of the first and second electrode sheets 210 and 220 also has the same structure. Namely, the electrode sheet has a structure in which an electrode slurry has been applied on one surface and the other surface of a metal foil.

In FIG. 3(a), the non-coated portions 212 and 222 are formed only at the upper portion in the width direction of each electrode sheet, but it is possible that the non-coated portion is formed at each of the upper and lower portions in the width direction of the coated portions 211 and 221. This is a case that the coated portion is positioned between non-coated portions at the upper and lower portions in the width direction.

Referring to the side view of FIG. 3(b), the sheet part of the metal foil is omitted in the drawing, and only the overall appearance of the coated portions and electrode sheets 210 and 220 is shown. Further, since the connection tag 240 is removed later, it is not illustrated in the side view of FIG. 3(b).

A soft connection sheet, which is more flexible than the electrode sheet made of a metal foil, may be used as the flexible connection sheet 250. Any flexible material capable of relieving local tension concentration of the roll-to-roll process may be used. The flexible connection sheet is made of one selected from the group consisting of polyethylene terephthalate (PET), polyethylene naphthalate (PEN), oriented polypropylene (OPP), polyimide (PI), polybutylene terephthalate (PBT), polyester, polyacetal, polyamide, polyethersulfone, polyphenyleneoxide, polyphenylene sulfide, polyethylenenaphthalene, and flexible silicon.

Further, the length and thickness of the flexible connection sheet 250 may be appropriately selected in the range of relieving stress between electrode sheets. There are various sizes of electrode sheets, depending on the type of manufactured electrode cells or batteries. Hence, the length of the flexible connection sheet 250 may be determined in a wide range according thereto. Specifically, the length of the flexible connection sheet 250 may be in the range of about 100 to about 2000 mm. A 100 mm sheet may be used for a ultrasmall battery, and a 2000 mm sheet may be used for a large size battery such as a battery for a vehicle.

The thickness of the flexible connection sheet 250 may be determined in consideration of the material and physical properties of the sheet, and the characteristics of the battery. Herein, it is not preferable that the thickness of the flexible connection sheet 250 is greater than that of the first and second electrode sheets 210 and 220 in terms of relieving stress. Further, in the roll-to-roll process, the flexible connection sheet 250 is also wound on the roller together with the first and second electrode sheets 210 and 220. Hence, when making the flexible connection sheet thicker, stress may be concentrated on the flexible connection sheet 250 and its neighboring region. Hence, it is preferable that the thickness of the flexible connection sheet 250 is the same as the thickness of the first and second electrode sheets 210 and 220.

It is more preferable that the thickness of the flexible connection sheet 250 is smaller than that of the first and second electrode sheets 210 and 220 as shown in FIG. 3 so that the stress between electrode sheets can be better absorbed. Specifically, the thickness of the flexible connection sheet 250 may be in the range of about 10 to about 30 μm, but the range may be changed according to the type or shape of the battery.

A known general tape may be used as the adhesive tape for connecting the electrode sheets 210 and 220 to the flexible connection sheet 250. What is obtained by applying an adhesive on a film sheet made of paper, synthetic resin, etc. may be used as the tape. A tape, which is used to connect one side of the first electrode sheet 210 to one side of the flexible connection sheet 250, is called a first tape 230a, and a tape, which is used to connect one side of the second electrode sheet 220 to the other side of the flexible connection sheet 250, is called a second tape 230b, but the same tape may be used as the first and second tapes 230a and 230b. What is important is not type of the tape, but whether the flexible connection sheet 250 portion between the first electrode sheet 210 and the second electrode sheet 220 has been extended to a predetermined length to relieve stress as shown in FIG. 3. In the example such as FIG. 2, two electrode sheets may directly contact each other or there may be a very small gap, and the tap is attached on one surface and the other surface. Hence, it is difficult to relieve or absorb stress. The present embodiment is different in that a flexible connection sheet 250 of a predetermined length has been extended between first and second electrode sheets 210 and 220. The first and second tapes 230a and 230b are attached on the first electrode sheet 210 and one side of the flexible connection sheet 250 and are attached on the second electrode sheet 220 and the other side of the flexible connection sheet 250 to thereby connect the flexible connection sheet 250 to the first and second electrode sheets 210 and 220 (see FIG. 3(b)).

Further, as shown in FIG. 3, it is preferable that the tape is attached on only the coated portions 211 and 221. The non-coated portions 212 and 222 are electrode foil (metal part), and various machining for battery production such as tab processing or laser processing are performed on the non-coated portions. Therefore, since the tape on the non-coated portion may interfere with machining, the tape is preferably not attached on the non-coated portions 212 and 222. Further, when the adhesive of the tape flows into the electrode foil portion, it may influence the machining. Hence, it is preferable that the tapes 230a and 230b attached on the coated portions 211 and 221 and the flexible connection sheet 250 with a slight space between the non-coated portions 212 and 222.

The tapes 230a and 230b are attached while covering a certain range of the portion around the end of each electrode sheet and the portion around the side of the flexible connection sheet 250. The length of the tapes 230a and 230b, which cover the electrode sheet and the flexible connection sheet may be 30 mm in the case of an ultrasmall battery. The length of the tapes 230a and 230b may be determined in a range that may stably attach the electrode sheets 210 and 220 to the flexible connection sheet 250. Herein, the flexible connection sheet 250 is extended to a predetermined length to relieve stress, and the length of the tapes 230a and 230b is smaller than that of the flexible connection sheet 250. The length of the tapes 230a and 230b is determined in an appropriate range for connection between sheets, and the flexible connection sheet 250 is installed to relieve stress. Hence, each length may be determined in consideration of the purpose, and there may be no particular relationship between the length of the tapes 230a and 230b and the length of the flexible connection sheet 250. However, the length of the flexible connection sheet may correspond between about 3 to about 10 times of the length of the tapes 230a and 230b.

If the flexible connection sheet 250 is arranged between the first and second electrode sheets 210 and 220 and they are attached using tapes 230a and 230b, the adhesive force increases as an additional effect. Namely, when electrode sheets and the flexible connection sheet 250 are attached using tapes 230a and 230b, the adhesive force is higher, compared to when first and second electrode sheets 210 and 220 are directly bonded by tapes. Hence, since the adhesive force of the attached portion between the flexible connection sheet 250 and the tapes 230a and 230b is greater than that of the attached portion between the electrode sheet and the tape, the overall adhesive force increases.

Second Embodiment

FIG. 4 is a schematic diagram illustrating an electrode sheet connection process according to a second embodiment of the present invention.

In the present embodiment, the connection tag 240 of FIG. 3 is removed. Generally, a connection tag 240 indicates that the use of the first electrode sheet 210 has been terminated, and the portion, on which the connection tag 240 is attached, is a connection part between two electrode sheets. The connection tag 240 may be identified with the naked eye, and the color can be identified by a color sensor. However, a conventional color sensor may sometimes fail to recognize the connection tag 240 due to a low sensitivity. If the connection tag 240 is attached even during the battery assembly process after the connection of the electrode sheet, it may become a cause of a product defect.

In the present embodiment, such a connection tag 240 is removed, and connection parts of first and second electrode sheets are configured by only the flexible connection sheet 250 and tapes 230a and 230b. Since the flexible connection sheet 250 is extended to a predetermined length, it is easily recognized with the naked eye. Further, since the flexible connection sheet 250, particularly a sheet made of a synthetic resin such as PET has an excellent light transmittance, the detection efficiency is excellent when sensed by an optical sensor.

Hence, in the present invention, the flexible connection sheet 250 is sensed by a sensor, etc. without a connection tag 240. In this case, it is possible to easily recognize the point of time of termination of use of the electrode sheet, and the electrode connection part.

Third Embodiment

FIG. 5 is a schematic diagram illustrating an electrode sheet connection process according to a third embodiment of the present invention.

The present embodiment is different from the first embodiment in that the width of the flexible connection sheet 250 is smaller than the width of the second electrode sheet 220. Namely, in the first embodiment of FIG. 3, the first electrode sheet 250 is extended to the metal foil part corresponding to the non-coated portions 212 and 221. In this case, the width of the flexible connection sheet 250 is the same as that of the electrode sheet. In FIG. 5, the width of the flexible connection sheet 250 is the same as the width of the coated portions 211 and 222.

An electrode sheet is composed of a non-coated portion formed of only a metal foil, and a coated portion, on which an electrode slurry has been coated. As such, tension is not significantly applied to the non-coated portion, compared to the coated portion. Hence, the flexible connection sheet 250 may be made to connect only the coated portions 211 and 221 as in FIG. 5. Further, in the structure of FIG. 3, the adhesive leaked from the tapes 230a and 230b may flow into the non-coated portions 212 and 222 through the flexible connection sheet 250. Hence, it is preferable that the width of the flexible connection sheet 250 is limited to that of the coated portions 211 and 221. Further, in FIG. 3, the flexible connection sheet 250 is not attached on the non-coated portions 212 and 222. The non-coated portions 212 and 222 contact each other. Hence, when the electrode sheet is wound, the end of the flexible connection sheet 250 contacting the non-coated portions 212 and 222 may be bent, and if such a bent portion is wound, stress imbalance may be caused.

Hence, as in the third embodiment, it is preferable that the width of the flexible connection sheet 250 is smaller than the width of the first and second electrode sheets 210 and 220, and particularly, the width of the flexible connection sheet 250 is the same as the width of the coated portions 211 and 221.

The present invention has been described with reference to various embodiments. The present invention also relates to an electrode sheet manufactured by the method of connecting electrode sheets.

An electrode sheet 200 of the present invention includes: a first electrode sheet 210; a second electrode sheet 220; a flexible connection sheet 250 of a predetermined length, which is arranged between the first electrode sheet 210 and the second electrode sheet 220; a first tape 230a which is used to attach one side of the first electrode sheet 210 to one side of the flexible connection sheet 250; and a second tape 230b which is used to attach one side of the second electrode sheet 220 to the other side of the flexible connection sheet 250. Since the electrode sheet 200 of the present invention includes a flexible connection sheet 250 extended to a predetermined length between first and second electrode sheets 210 and 220, the flexible connection sheet 250 relieves the local tension concentration, thereby relieving stress applied to the electrode sheet 200.

Further, it is possible to secure a running margin between processes and secure a margin at the time of adjusting the meandering movement by the flexible connection sheet 250 in the process before and after replacement of the electrode sheet.

Further, the electrode sheet connection part may be easily recognized by the flexible connection sheet 250 without a connection tag.

The width of the flexible connection sheet 250 may be the same as or smaller than the width of the first electrode sheet 210 and the second electrode sheet 220.

When the width of the flexible connection sheet 250 is smaller than the width of the first and second electrode sheets 210 and 220, it is preferable that the width of the flexible connection sheet 250 is the same as the width of the coated portions 211 and 221. In this case, as shown in FIG. 5, the flexible connection sheet 250 is connected to the first electrode sheet 210 and the second electrode sheet 220 as the flexible connection sheet 250 is arranged to be parallel to the first electrode sheet 210 and the second electrode sheet 220.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 10, 210: first electrode sheet
11, 211: coated portion
12, 212: non-coated portion
20, 220: second electrode sheet
21, 221: coated portion
22, 222: non-coated portion3
30: tape
230a: first tape
230b: second tape
40, 240: connection tag
250: flexible connection sheet

The invention claimed is:

1. A method for connecting electrode sheets in a roll-to-roll process, the method comprising:
positioning a flexible connection sheet between a first electrode sheet and a second electrode sheet;
coupling the first electrode sheet to the flexible connection sheet by coupling a first side of the first electrode sheet to a first side of the flexible connection sheet; and
coupling the second electrode sheet to the flexible connection sheet by coupling a first side of the second electrode sheet to a second side of the flexible connection sheet.

2. The method of claim 1, wherein;
the flexible connection sheet is made of one selected from the group consisting of polyethylene terephthalate (PET), polyethylene naphthalate (PEN), oriented polypropylene (OPP), polyimide (PI), polybutylene terephthalate (PBT), polyester, polyacetal, polyamide, polyethersulfone, polyphenyleneoxide, polyphenylene sulfide, polyethylenenaphthalene, and flexible silicon.

3. The method of claim 1, wherein;
a length of the flexible connection sheet is between 100 to 2000 mm.

4. The method of claim 1, wherein;
the first side of the first electrode sheet is coupled to the first side of the flexible connection sheet using a first tape, the first side of the second electrode sheet is coupled to the second side of the flexible connection sheet using a second tape, and the first and second tapes are not attached on electrode slurry non-coated portions of the first electrode sheet and the second electrode sheet, respectively.

5. The method of claim 1, wherein;
a thickness of the flexible connection sheet is about the same as thicknesses of the first electrode sheet and the second electrode sheet, respectively.

6. The method of claim 1, wherein;
a thickness of the flexible connection sheet is smaller than thicknesses of the first electrode sheet and the second electrode sheet, respectively.

7. The method of claim 1, wherein;
the first electrode sheet or the second electrode sheet does not include a connection tag.

8. The method of claim 1, wherein;
a width of the flexible connection sheet is about the same as-widths of the first electrode sheet and the second electrode sheet, respectively.

9. The method of claim 1, wherein;
a width of the flexible connection sheet is smaller than widths of the first electrode sheet and the second electrode sheet, respectively.

10. The method of claim 9, wherein;
the width of the flexible connection sheet is about the same as widths of electrode slurry coated portions of the first electrode sheet and the second electrode sheet, respectively,
and wherein the flexible connection sheet is coupled to the first electrode sheet and the second electrode sheet by positioning the flexible connection sheet to be parallel to the electrode slurry coated portions of the first electrode sheet and the second electrode sheet so that the width of the flexible connection sheet and the widths of the electrode slurry coated portions of the first electrode sheet and the second electrode sheet are opposite to each other.

11. An electrode sheet comprising:
a first electrode sheet;
a second electrode sheet;
a flexible connection sheet which is positioned between the first electrode sheet and the second electrode sheet;
a first tape for coupling a first side of the first electrode sheet to a first side of the flexible connection sheet; and
a second tape for coupling a first side of the second electrode sheet to a second side of the flexible connection sheet opposite the first side.

12. The electrode sheet of claim 11, wherein;
a width of the flexible connection sheet is about the same as widths of the first electrode sheet and the second electrode sheet, respectively.

13. The electrode sheet of claim 11, wherein;
a width of the flexible connection sheet is about the same as widths of electrode slurry coated portions of the first electrode sheet and the second electrode sheet, respectively,
and wherein the flexible connection sheet is coupled to the first electrode sheet and the second electrode sheet by positioning the flexible connection sheet to be parallel to the electrode slurry coated portions of the first electrode sheet and the second electrode sheet so that the width of the flexible connection sheet and the widths of the electrode slurry coated portions of the first electrode sheet and the second electrode sheet are opposite to each other.

\* \* \* \* \*